(12) United States Patent
Mantel (10) Patent No.: US 10,337,336 B2
(45) Date of Patent: Jul. 2, 2019

(54) SYSTEM AND METHOD FOR BLADE WITH PROTECTIVE LAYER

(71) Applicant: United Technologies Corporation, Hartford, CT (US)

(72) Inventor: Blake M. Mantel, Newington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 239 days.

(21) Appl. No.: 15/048,533

(22) Filed: Feb. 19, 2016

(65) Prior Publication Data

US 2016/0169008 A1 Jun. 16, 2016

Related U.S. Application Data

(63) Continuation of application No. PCT/US2014/060727, filed on Oct. 15, 2014.

(60) Provisional application No. 61/895,303, filed on Oct. 24, 2013.

(51) Int. Cl.
*F01D 5/30* (2006.01)
*F01D 5/28* (2006.01)
*C23C 4/134* (2016.01)

(52) U.S. Cl.
CPC ............ *F01D 5/288* (2013.01); *C23C 4/134* (2016.01); *F01D 5/284* (2013.01); *F01D 5/3007* (2013.01); *F01D 5/3092* (2013.01); *F05D 2220/32* (2013.01); *F05D 2230/312* (2013.01); *F05D 2230/80* (2013.01); *F05D 2240/30* (2013.01); *F05D 2300/522* (2013.01); *Y02T 50/672* (2013.01)

(58) Field of Classification Search
None
See application file for complete search history.

(56) References Cited

U.S. PATENT DOCUMENTS

| 4,028,787 | A | * | 6/1977 | Cretella | B23K 10/027 |
| | | | | | 29/889.1 |
| 4,207,029 | A | | 6/1980 | Ivanko et al. | |
| 4,291,448 | A | * | 9/1981 | Cretella | B23P 6/007 |
| | | | | | 29/402.07 |
| 4,417,854 | A | * | 11/1983 | Cain | F01D 5/284 |
| | | | | | 416/219 R |
| 4,820,126 | A | | 4/1989 | Gavilan | |
| 5,141,401 | A | * | 8/1992 | Juenger | F01D 5/3007 |
| | | | | | 416/219 R |

(Continued)

FOREIGN PATENT DOCUMENTS

| CH | 423431 | 10/1966 |
| EP | 0367958 | 5/1990 |
| EP | 2468434 | 6/2012 |

OTHER PUBLICATIONS

International Search Report and Written Opinion dated Jan. 2, 2015 in Application No. PCT/US2014/060727.

(Continued)

*Primary Examiner* — Eldon T Brockman
(74) *Attorney, Agent, or Firm* — Snell & Wilmer, L.L.P.

(57) ABSTRACT

A ceramic matrix composite blade may include an airfoil and a root. A protective metallic layer may be coupled to the root. The protective metallic layer may be plasma sprayed on the root. A portion of the protective metallic layer may be removed.

20 Claims, 8 Drawing Sheets

(56) References Cited

U.S. PATENT DOCUMENTS

| | | | | |
|---|---|---|---|---|
| 6,033,185 | A * | 3/2000 | Lammas | F01D 5/3038 |
| | | | | 416/193 A |
| 6,543,134 | B2 * | 4/2003 | Meier | B23P 6/007 |
| | | | | 29/889.1 |
| 9,200,516 | B2 * | 12/2015 | Gopalakrishnan | F01D 5/005 |
| 9,527,777 | B2 * | 12/2016 | Chamberlain | C04B 41/88 |
| 2004/0261914 | A1 | 12/2004 | Boucard et al. | |
| 2005/0178750 | A1 * | 8/2005 | Cheng | B23K 26/147 |
| | | | | 219/121.64 |
| 2006/0260125 | A1 | 11/2006 | Arnold et al. | |
| 2007/0087117 | A1 | 4/2007 | Jabado et al. | |
| 2008/0229567 | A1 * | 9/2008 | Bublath | B23P 6/005 |
| | | | | 29/402.11 |
| 2010/0254818 | A1 * | 10/2010 | Bozdogan | C23C 4/185 |
| | | | | 416/223 R |
| 2012/0082551 | A1 | 4/2012 | Macchia et al. | |
| 2012/0110848 | A1 * | 5/2012 | Szela | B23P 6/007 |
| | | | | 29/889.1 |
| 2013/0247586 | A1 | 9/2013 | Luczak | |
| 2014/0056714 | A1 * | 2/2014 | Gopalakrishnan | F01D 5/005 |
| | | | | 416/219 R |
| 2016/0137559 | A1 * | 5/2016 | Chamberlain | C04B 41/88 |
| | | | | 428/454 |
| 2016/0325387 | A1 * | 11/2016 | Szela | B23P 6/007 |

OTHER PUBLICATIONS

Extended European Search Report dated Oct. 19, 2016 in European Application No. 14856341.4.
International Preliminary Report on Patentability dated Apr. 26, 2016 in Application No. PCT/US2014/060727.

* cited by examiner

SYSTEM AND METHOD FOR BLADE WITH PROTECTIVE LAYER

CROSS-REFERENCE TO RELATED APPLICATIONS

This application is a continuation of, claims priority to and the benefit of, PCT/US2014/060727 filed on Oct. 15, 2014 and entitled "SYSTEM AND METHOD FOR BLADE WITH PROTECTIVE LAYER," which claims priority from U.S. Provisional Application No. 61/895,303 filed on Oct. 24, 2013 and entitled "SYSTEM AND METHOD FOR BLADE WITH PROTECTIVE LAYER." Both of the aforementioned applications are incorporated herein by reference in their entirety.

FIELD OF INVENTION

The present disclosure relates generally to gas turbine engines. More particularly, the present disclosure relates to blades in gas turbine engines.

BACKGROUND OF THE INVENTION

Gas turbine engines (such as those used in electrical power generation or used in modern aircraft) typically include a compressor, a combustion section, and a turbine. The compressor and the turbine typically include a series of alternating rotors and stators. The rotors may include blades having an airfoil and a root. The root may be inserted into a slot in a disk.

SUMMARY OF THE INVENTION

A method may include coupling a protective metallic layer to a root of a blade. A portion of the protective metallic layer may be removed. In additional or alternative embodiments of any of the foregoing embodiments, the root may comprise a ceramic matrix composite material. In additional or alternative embodiments of any of the foregoing embodiments, the protective metallic layer may be plasma sprayed onto the root. In additional or alternative embodiments of any of the foregoing embodiments, the protective metallic layer may comprise a cobalt alloy. In additional or alternative embodiments of any of the foregoing embodiments, the root may be inserted into a slot in a turbine disk.

A method of refurbishing a blade may comprise removing material coupled to a root of a blade. A protective metallic layer may be coupled to the root. In additional or alternative embodiments of any of the foregoing embodiments, the method may include grinding the protective metallic layer. In additional or alternative embodiments of any of the foregoing embodiments, the root may comprise a ceramic matrix composite material.

A blade may comprise an airfoil and a root. A plasma sprayed protective metallic layer may be coupled to the root. In additional or alternative embodiments of any of the foregoing embodiments, the plasma sprayed protective metallic layer may comprise a cobalt alloy. In additional or alternative embodiments of any of the foregoing embodiments, the root may comprise a ceramic matrix composite material.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Blades comprising a protective metallic layer are disclosed herein. In various embodiments, a blade may comprise a ceramic matrix composite root. The root may be configured to be positioned within a slot in a turbine disk. Contact between the root and the slot may prevent the blade from being ejected from the turbine disk in response to rotation of the turbine disk. The protective metallic layer may prevent contact between the root and the turbine disk, and thus diminish damage to the root from contact with the turbine disk.

Figure 1:
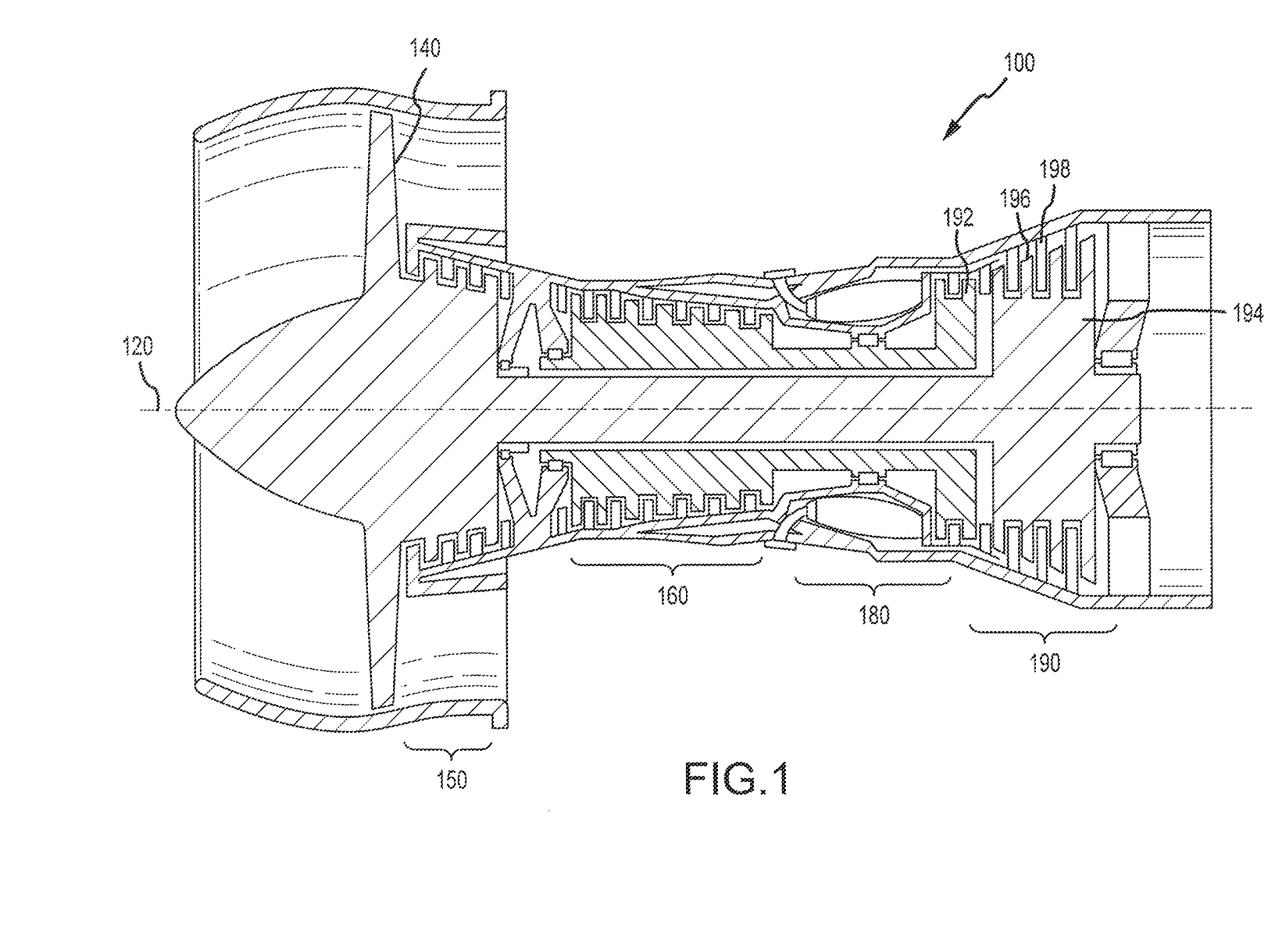
FIG. 1 illustrates a schematic cross-section view of a gas turbine engine in accordance with various embodiments.

Referring to FIG. 1, a gas turbine engine 100, such as a turbofan gas turbine engine, is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in the compressor sections 150, 160 may be mixed with fuel and burned in combustion section 180 and expanded across turbine section 190. Turbine section 190 may include high pressure rotors 192 and low pressure rotors 194, which rotate in response to the expansion. Turbine section 190 may comprise alternating rows of rotary airfoils or blades 196 and static airfoils or vanes 198. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
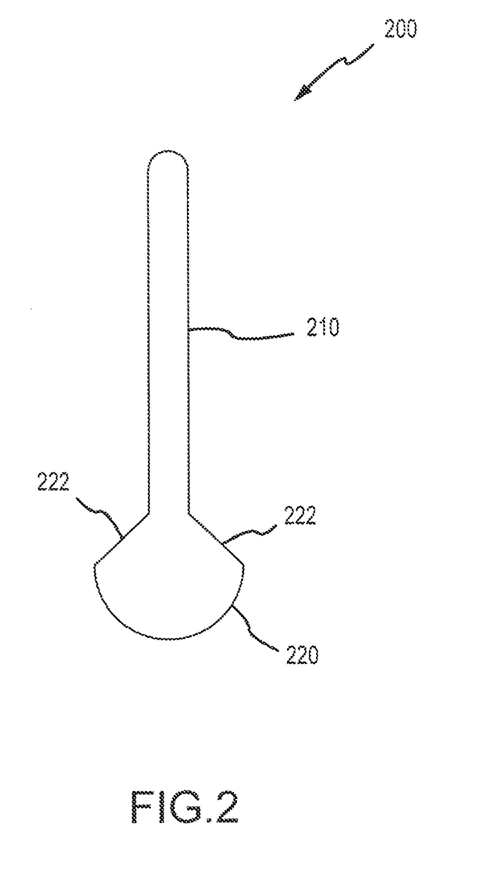
FIG. 2 illustrates a schematic cross-section view of a blade in accordance with various embodiments.

Referring to FIG. 2, a schematic cross-section of a blade 200 is illustrated according to various embodiments. Blade 200 may comprise an airfoil 210 and a root 220. In various embodiments, blade 200 may comprise a turbine blade. In various embodiments, root 220 and/or airfoil 210 may comprise a ceramic material and/or a ceramic matrix composite material. Root 220 may be prepared for deposition of metallic material on root 220. For example, in various embodiments, root 220 may be sandblasted or ground. Root may comprise pressure surfaces 222. Pressure surfaces 222 may be configured to contact a turbine disk. In various embodiments, pressure surfaces 222 may be substantially planar.

Figure 3:
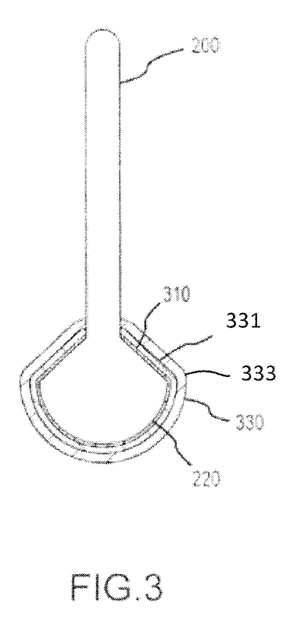
FIG. 3 illustrates a schematic cross-section view of a blade with a protective metallic layer in accordance with various embodiments.

Referring to FIG. 3, a schematic cross-section of a blade 200 with a protective metallic layer 330 is illustrated according to various embodiments. Protective metallic layer 330 may be coupled to root 220. In various embodiments, a bond coat 310, such as a metallic silicon, may be applied to root 220, and protective metallic layer 330 may be deposited on the bond coat 310. Bond coat 310 may assist in adhering protective metallic layer 330 to root 220.

Protective metallic layer 330 may be deposited by a variety of suitable processes. In various embodiments, protective metallic layer 330 may be plasma sprayed onto root 220. In various embodiments, plasma spraying may comprise introducing a material to a plasma jet emanating from a plasma torch. The material may be melted in the plasma jet and propelled toward root 220. The melted material may rapidly solidify and form a deposit on root 220.

However, in various embodiments, protective metallic layer 330 may be plated onto root 220. In various embodiments, plating may comprise electroplating or electroless plating. Electroplating may comprise supplying an ionic metal with electrons to form a non-ionic coating on root 220. Electroless plating may comprise oxidizing hydrogen to produce a negative charge on root 220, which may attract a metallic material to couple to root 220.

Protective metallic layer 330 may comprise a variety of suitable metals or metal alloys. For example, in various embodiments, protective metallic layer 330 may comprise a cobalt alloy, a nickel alloy, zirconia, and/or a range of cobalt-chromium alloys which may comprise any combination of metals such as cobalt, nickel, iron, aluminum, boron, carbon, chromium, manganese, molybdenum, phosphorus, sulfur, silicon, and titanium (e.g., STELLITE® alloys). STELLITE® is a trademark of Deloro Stellite Company.

In various embodiments, a protective metallic layer 330 may comprise a plurality of metallic layers. A first metallic layer 331 may be coupled to root 220, and a second metallic layer 333 may be coupled to first metallic layer 331. First metallic layer 331 may comprise a density which is less than a density of second metallic layer 333. Additionally, first metallic layer 331 may comprise a porosity which is greater than a porosity of second metallic layer 333. Thus, first metallic layer 331 may be more compliant than second metallic layer 333. The greater compliancy of first metallic layer 331 may absorb pressure transferred through second metallic layer 333 and distribute the pressure on root 220, which may decrease the amount of pressure on discreet points on root 220. Distributing the pressure may decrease damage to root 220. However, the relatively greater density of second metallic layer 333 may prevent damage to second metallic layer 333 from contact with a turbine disk. In various embodiments, protective metallic layer 330 may comprise any number of metallic layers, such as one, two, three, or more metallic layers.

Figure 4:
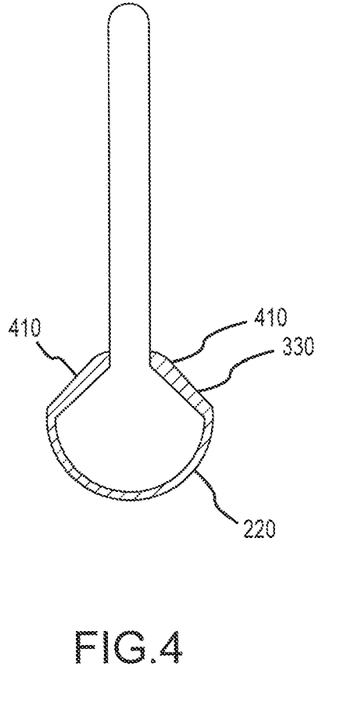
FIG. 4 illustrates a schematic cross-section view of a blade with a portion of a protective metallic layer removed in accordance with various embodiments.

Referring to FIG. 4, after deposition of protective metallic layer 330 on root 220, a portion of protective metallic layer 330 may be removed. Removal of a portion of protective metallic layer 330 may be accomplished using any suitable method, for example, grinding, sanding, water jetting, and electric discharge machining. In various embodiments, protective metallic layer 330 may be ground to a desired shape and size. Thus, protective metallic layer 330 may be deposited at a thickness greater than desired for the final manufactured component, and ground to meet design specifications. In various embodiments, pressure surfaces 410 may be ground into protective metallic layer 330. Pressure surfaces 410 may be configured to contact a turbine disk. In various embodiments, pressure surfaces 410 may be substantially planar.

Figure 5A:
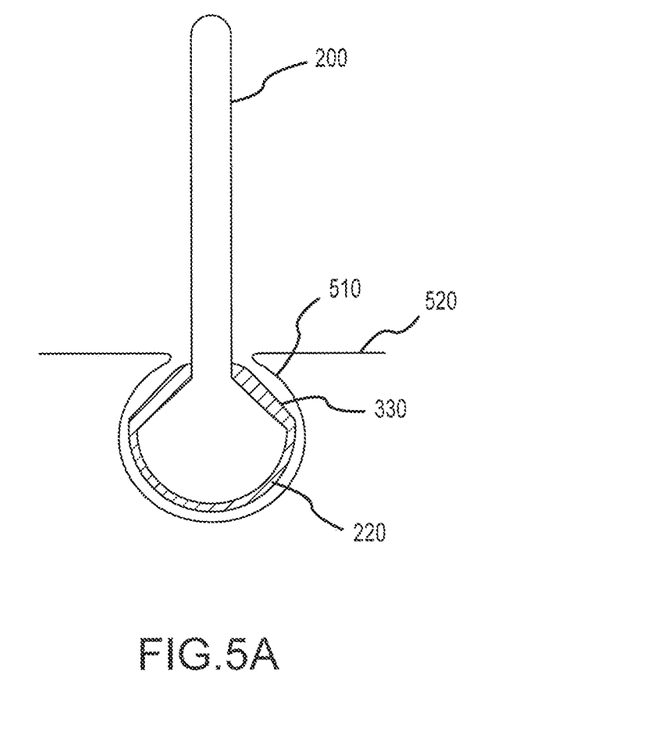
FIG. 5A illustrates a schematic cross-section view of a blade in a turbine disk in accordance with various embodiments.

Referring to FIG. 5A, a schematic cross-section of blade 200 in a slot 510 in a turbine disk 520 is illustrated according to various embodiments. In various embodiments, root 220 may be positioned within slot 510 in turbine disk 520. Protective metallic layer 330 may provide a barrier layer between root 220 and turbine disk 520, such that root 220 does not contact turbine disk 520 in various embodiments.

Figure 5B:
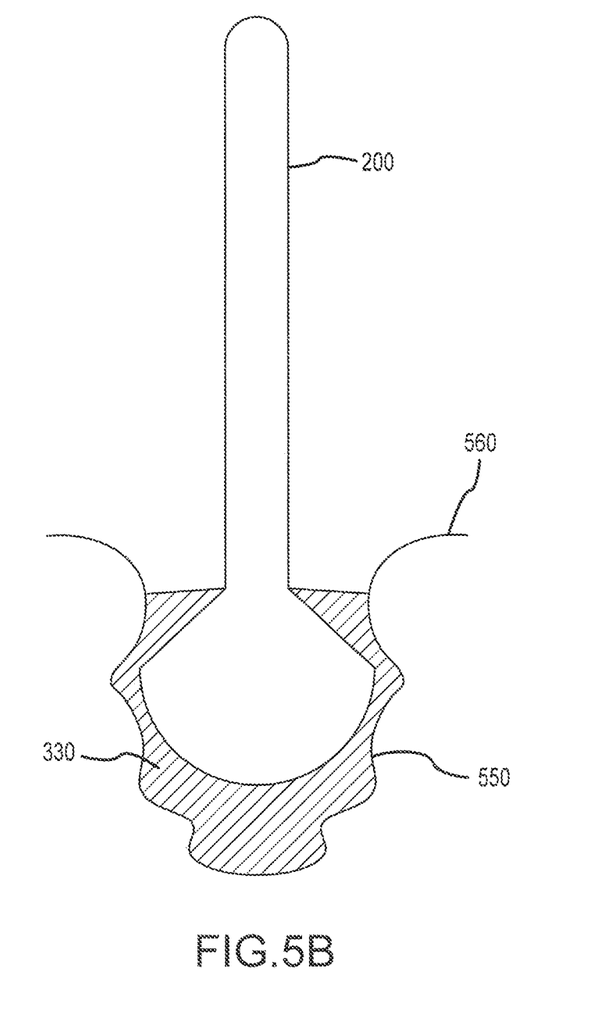
FIG. 5B illustrates a schematic cross-section view of a blade in a fir tree slot in a turbine disk in accordance with various embodiments.

Referring to FIG. 5B, a schematic cross-section of blade 200 in a fir tree slot 550 in a turbine disk 560 is illustrated according to various embodiments. In various embodiments, protective metallic layer 330 may be ground or machined into various shapes, such as a fir tree shape as shown in FIG. 5B. Blade 200 and protective metallic layer 330 may be slid into fir tree slot 550, securing blade within turbine disk 560. Thus, protective metallic layer 330 may allow blades with ceramic matrix composite roots to be utilized in turbine disks with slots designed for conventional blades.

Figure 6:
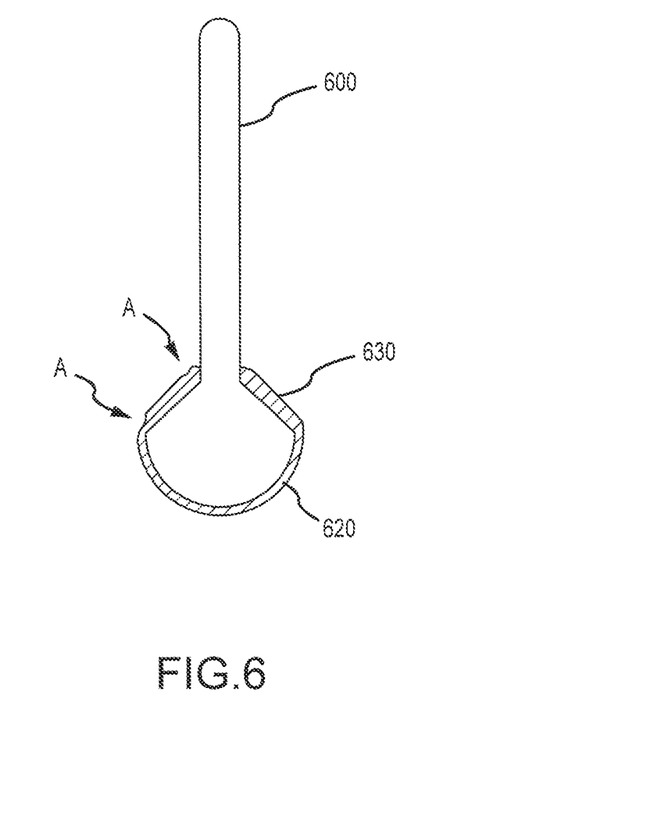
FIG. 6 illustrates a schematic cross-section view of a blade with a worn protective metallic layer in accordance with various embodiments.

In various embodiments, processes similar to those described herein may be used to refurbish a blade. For example, referring to FIG. 6, a blade 600 comprising a worn protective metallic layer 630 is illustrated according to various embodiments. Damage is illustrated at points A. Worn protective metallic layer 630 may be removed from root 620. For example, in various embodiments, grinding, water jetting, or electric discharge machining may be utilized in order to remove worn protective metallic layer 630 and/or other materials coupled to root 620. A new protective metallic layer may be coupled to root 620 as previously described herein. Thus, protective metallic layers may be replaced, allowing a lifetime of the blade to be extended.

Figure 7:
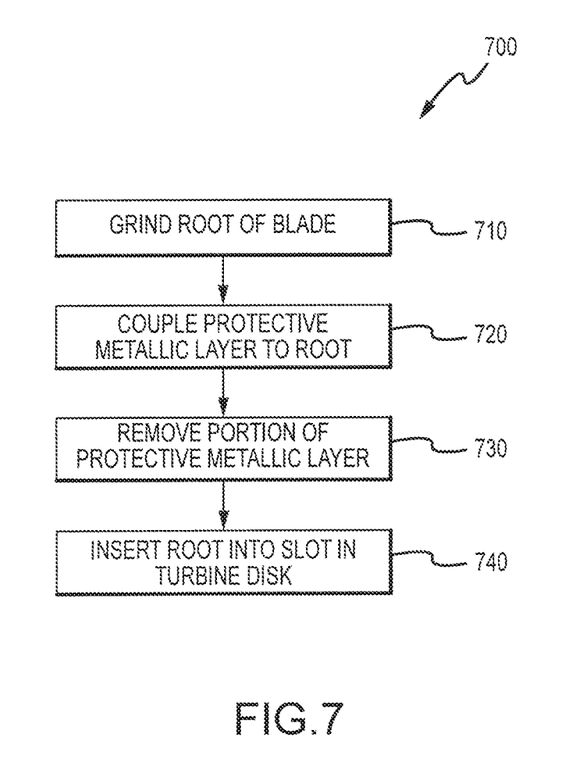
FIG. 7 illustrates a process for coupling a protective metallic layer to a root in accordance with various embodiments.

Referring to FIG. 7, a flowchart of a process 700 for coupling a protective metallic layer to a blade is illustrated according to various embodiments. In various embodiments, a method may include grinding a root of the blade (step 710). In various embodiments, the root may comprise a ceramic matrix composite material. The grinding process may remove materials previously deposited on the root. In various embodiments, the grinding process may decrease a size of the root in order to allow additional materials to be coupled to the root, such that the root with the additional materials is substantially the same size as the root prior to grinding. In various embodiments, additional processes, such as using a water jet or electric discharge machining may be utilized in order to remove materials coupled to the root.

A protective metallic layer may be coupled to the root (step 720). In various embodiments, the protective metallic layer may comprise a first metallic layer and a second metallic layer. In various embodiments, the first metallic layer may be plasma sprayed onto the root. However, in various embodiments, the first metallic layer may be plated onto the root. In various embodiments, a second metallic layer may be coupled to the first metallic layer. In various embodiments, the second metallic layer may be plasma sprayed onto the first metallic layer. In various embodiments, a thickness of the protective metallic layer may be between 0.08 inches-0.1 inches (0.20 cm-0.25 cm). However, in various embodiments, a thickness of the second metallic layer may be between 0.02 inches-0.25 inches (0.05 cm-0.64 cm), or any other suitable thickness. In various embodiments, the first metallic layer may comprise a first density, and the second metallic layer may comprise a second density. The second density may be greater than the first density.

In various embodiments, a portion of the protective metallic layer may be removed (step 730). Removing the portion of the protective metallic layer may comprise grinding the protective metallic layer. The protective metallic layer may be ground to a desired shape for the blade. In various embodiments, the protective metallic layer may be ground to be configured to be inserted into a slot in a turbine disk. In various embodiments, the protective metallic layer may be ground to include substantially planar pressure surfaces in the protective metallic layer. In various embodiments, the root may be inserted into a slot in a turbine disk (step 740).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
   grinding a root of a blade to decrease a size of the root;
   applying a bond coat to the root of the blade;
   coupling a protective metallic layer to the root of the blade, comprising:
     coupling a first protective metallic layer to the root of the blade;
     coupling a second protective metallic layer to the first protective metallic layer; and
   removing a portion of the second protective metallic layer to form a planar pressure surface on the root,
   wherein the second protective metallic layer is outward of the first protective metallic layer, the first protective metallic layer being more compliant than the second protective metallic layer, wherein the size of the root with the bond coat, the first protective metallic layer, and the second protective metallic layer is substantially the same size as prior to grinding the root, and wherein the protective metallic layer comprises a thickness between 0.08 inches and 0.1 inches.

2. The method of claim 1, wherein the root comprises a ceramic matrix composite material.

3. The method of claim 1, wherein the coupling the first protective metallic layer comprises plasma spraying the first protective metallic layer onto the root.

4. The method of claim 1, wherein the coupling the first protective metallic layer comprises plating the first protective metallic layer on the root.

5. The method of claim 1, wherein the first protective metallic layer comprises a first density and the second protective metallic layer comprises a second density, wherein the second density is greater than the first density.

6. The method of claim 1, wherein the bond coat comprises silicon.

7. The method of claim 1, further comprising positioning the root within a slot in a turbine disk.

8. The method of claim 1, wherein the first protective metallic layer comprises a cobalt alloy.

9. The method of claim 1, wherein the removing the portion of the second protective metallic layer comprises grinding the second protective metallic layer.

10. The method of claim 1, wherein the first protective metallic layer and second protective metallic layers are configured to distribute pressure to the root.

11. The method of claim 1, wherein the second protective metallic layer is in direct contact with a turbine disk.

12. A method of refurbishing a blade comprising:
removing material coupled to a root of the blade and grinding the root to decrease a size of the root;
applying a bond coat to the root of the blade;
coupling a first protective metallic layer to the root;
coupling a second protective metallic layer to the first protective metallic layer, wherein the size of the root with the bond coat, the first protective metallic layer, and the second protective metallic layer is substantially the same size of the root prior to grinding; and
machining the second protective metallic layer into a fir tree shape;
wherein the second protective metallic layer is outward of the first protective metallic layer, the first protective metallic layer being more compliant than the second protective metallic layer.

13. The method of claim 12, further comprising grinding the second protective metallic layer.

14. The method of claim 12, wherein the root comprises a ceramic matrix composite material.

15. The method of claim 12, wherein coupling the first protective metallic layer to the root comprises plasma spraying the first protective metallic layer to the root and plasma spraying the second protective metallic layer to the first protective metallic layer.

16. The method of claim 12, wherein the first protective metallic layer comprises a first density, and wherein the second protective metallic layer comprises a second density, wherein the first density is less than the second density.

17. A blade comprising:
an airfoil;
a root coupled to the airfoil;
a bond coat applied to the root;
a plasma sprayed protective metallic layer comprising,
a plasma sprayed first protective metallic layer coupled to the root; and
a plasma sprayed second protective metallic layer coupled to the first protective metallic layer;
wherein at least one planar pressure surface is formed into the root by removing a portion of the second protective metallic layer, wherein the second protective metallic layer is outward of the first protective metallic layer, the first protective metallic layer being more compliant than the second protective metallic layer, wherein the root is grinded to decrease a size of the root before application of the bond coat to the root such that the size of the root with the bond coat, the first protective metallic layer, and the second protective metallic layer is substantially the same size of the root prior to grinding, and wherein the protective metallic layer comprises a thickness between 0.08 inches and 0.1 inches.

18. The blade of claim 17, wherein the plasma sprayed first protective metallic layer comprises a plasma-sprayed cobalt alloy.

19. The blade of claim 17, wherein the root comprises a ceramic matrix composite material.

20. The blade of claim 17, wherein the second protective metallic layer is in direct contact with a turbine disk.

* * * * *